March 17, 1936. D. S. MAXWELL 2,034,587
DEFLECTOR FOR VEHICLE HEATERS
Filed March 6, 1933
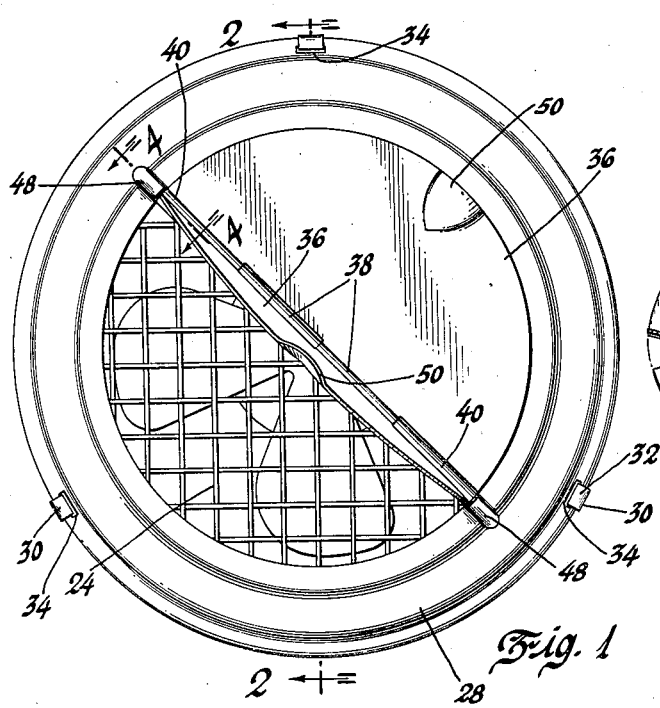
Fig. 1
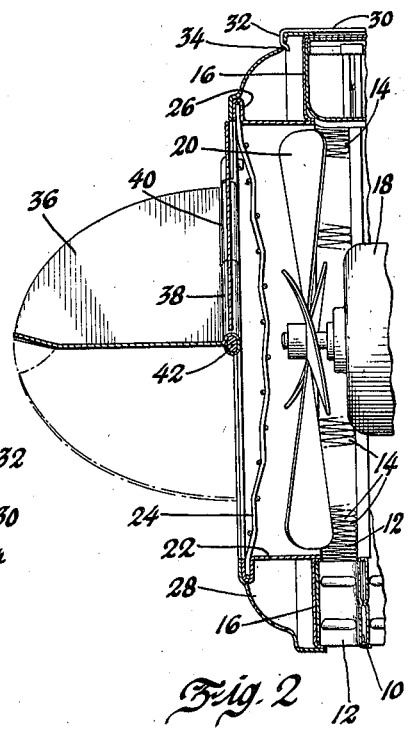
Fig. 2
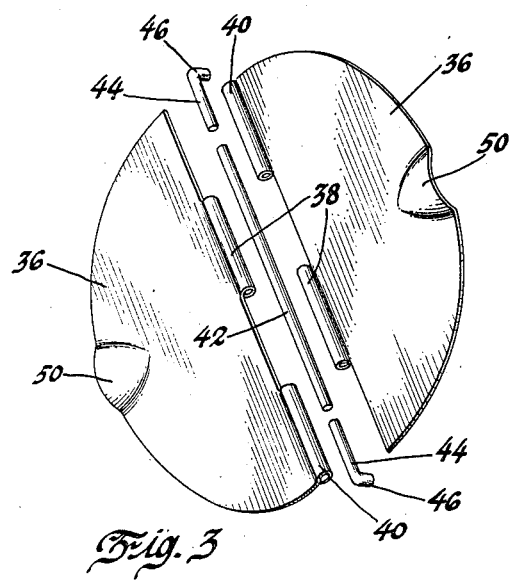
Fig. 3
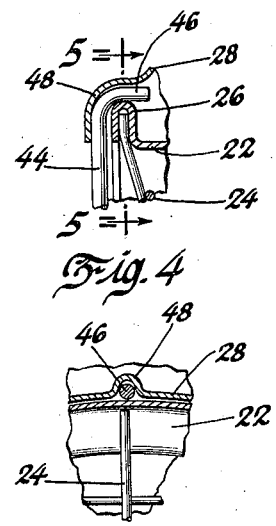
Fig. 4
Fig. 5
Inventor
Daniel S. Maxwell
By Blackmore, Spencer & Hush
Attorneys Patented Mar. 17, 1936

2,034,587

UNITED STATES PATENT OFFICE 2,034,587

DEFLECTOR FOR VEHICLE HEATERS

Daniel S. Maxwell, Lockport, N. Y., assignor to Harrison Radiator Corporation, Lockport, N. Y., a corporation of Delaware Application March 6, 1933, Serial No. 659,609

4 Claims. (Cl. 98—2)

This invention relates to heating devices for vehicles and more particularly to the deflecting means which are provided on the heating device to render it possible to direct the heated air being discharged from the heater into any desired portion of the vehicle, such as toward the floor boards or side walls of the vehicle body.

It is, of course, old to provide deflector plates which may be adjusted to various positions relative to the heating device and to each other, but in all the prior art structures I am familiar with, the structures employed to permit of this adjustment are relatively expensive and are generally unsatisfactory because they either do not positively hold the deflector plates in the position to which they have been set, due to the fact that the vibration of the vehicle during use causes them to gradually change their position, or they employ complicated spring tension or friction devices which must be frequently adjusted to serve their purpose of holding the deflector plates in the desired position.

It is therefore an object of this invention to provide a structure for pivotally securing two or more deflector plates to a vehicle heater and to each other in such manner that the deflector plates may be swung toward or away from the heater to direct the heated air to any desired region in the vehicle body compartment, which structure will not only be more simple and less expensive to produce than the prior art devices, but which will also function in a more satisfactory manner to hold the deflector plates in the position to which they have been set, without employing any spring tension or friction devices which must be adjusted at frequent intervals.

Other objects and advantages of the invention will be apparent upon referring to the specification and accompanying drawing, in which:

Figure 1 is a front elevation of a vehicle heater, showing my improved deflecting means associated therewith.

Figure 2 is a fragmentary sectional view taken on the line 2—2 of Figure 1.

Figure 3 is a perspective view of the deflector parts detached from each other, but showing how these parts are assembled together.

Figure 4 is a fragmentary sectional view taken on the line 4—4 of Figure 1.

Figure 5 is a fragmentary sectional view taken on the line 5—5 of Figure 4.

The reference numeral 10 indicates an annular chamber or passageway adapted to receive any suitable heated medium, such as hot water from the engine cooling circulating system or steam from any suitable boiler means associated with the engine or the exhaust pipe. While the construction of the heater forms no part of the present invention, it may be explained that in the structure shown, there are a plurality of these passageways 10 which are suitably connected together to form a common inlet and outlet for the heating medium, and they are spaced from each other by zig-zag shaped fins 12 which alternately contact with and are soldered or brazed to the walls of the passageways 10. The spaces between the zig-zag shaped portions of the fins 10 form radially extending air passages 14. An annular disc-shaped member 16 having a large opening formed in its central portion is secured in any suitable manner to the exposed portions of the outer set of fins 12, as shown in Figure 2.

An electric motor 18 is supported in the center portion of the heater and serves to drive a fan 20. An annular shroud member 22 of ring form is secured to and is supported by the member 16, and this shroud extends out from the face of the heater to form a discharge opening for the latter. The direction of rotation of the fan is such that air will be drawn in through the radially extending air passages 14 and will be discharged axially with respect to the fan through the shroud 22. It will be understod that whenever a heating medium such as hot water or steam is being circulated through the passageways 10, the fins 12 will be heated thereby, and the air being drawn in through the radially extending spaces between the fins will become heated by coming into contact with these fins. In order to prevent the occupants of the vehicle from coming into contact with the fan, a wire screen member 24 is secured in place at the outer end of the shroud 22, the end of the latter being bent outwardly and then inwardly as at 26 to form a groove to receive the edge of the screen 24. A face plate 28, in the form of an annular ring having an opening of a size corresponding with the diameter of the shroud 22 formed in its central portion, is held against the outer end of the shroud and overlaps and extends around the disc-shaped member 16 and the end portions of the outer set of fins 12. The face plate is held in this position by means of fastening devices 30 which have one end 32 hooked into a slot 34 in the face plate, the other end being detachably secured in any suitable manner to some part of the heater.

In order that the heated air which is being discharged from the heater may be directed toward any desired portion of the vehicle, a pair of semi-circular shaped deflector plates 36 are adjustably supported in the opening formed in the face plate 28. These plates are of exactly the same shape and have formed at their straight side edge rolled-up centrally located hinge portions 38 and outer hinge portions 40 which are spaced from each other. The two deflector plates are pivotally connected to each other by placing them in the position shown in Figure 3, so that the hinge portion 38 of one plate fits within the space between the hinge portions 38 and 40 of the other plate, whereupon a straight hinge pin 42 may be assembled within the rolled-up hinge portions on both plates, the hinge pin extending all the way through the center hinge portions 38 of each plate and part way through the outer hinge portion 40 of each plate.

The assembly of the two pivotally connected deflector plates is secured to the heater by bent hinge pins 44 which are inserted into the ends of the outer hinge portions 40, the bent ends 46 of the hinge pins 44 extending over and beyond the groove 26 formed in the shroud 22, as best shown in Figure 4. Grooved portions 48 are formed in the face plate 28 and the bent hinge pins 44 fit within these grooved portions. It will be seen that the hinge pins 44 are thus clamped between the shroud 22 and the face plate 28, and that since they fit within the grooved portions 48, they cannot move in any direction relative to the face plate or the heater. The hinge pin is shown as being made in three pieces to facilitate assembly within the rolled-up hinge portions on the deflector plates, but it will be understood of course that a single hinge pin might be used, in which case one end of the hinge pin would be straight to permit insertion of the hinge pin into and through the hinge portions on the deflector plates, that end being bent over after assembly to form the bent end 46 which fits within the grooved portion 48 of the shroud. The deflector plates are each provided with outwardly curved portions 50 which render it possible for the occupants of the vehicle to get their fingers under the deflector plates when the latter are in closed position and it is desired to move them to another position.

Due to the fact that the rolled-up hinge portions are relatively long and may be made of the proper diameter so that the hinge pins 42 and 44 may fit snugly within them, a form of pivotal connection between each of the deflector plates and between the deflector plates and the heater is provided which will insure that the deflector plates will stay in the position they are set to regardless of the amount of vibration they may be subjected to during operation of the vehicle, while at the same time the deflector plates may be easily adjusted in position relative to the heater. Due to the type of hinge connection employed, it is unnecessary to provide any springs or friction devices to hold the deflector plates in the position in which they are set, and therefore it is not necessary to make any adjustments. This form of pivotal connection will serve to hold the deflector plates in the desired position during the entire life of the heater without requiring any attention whatsoever.

It is thought from the foregoing taken in connection with the accompanying drawing that the construction and operation of the device will be apparent to those skilled in the art, and it will be understood that various changes in size, shape and details of assembly may be made without departing from the spirit and scope of the appended claims.

I claim:

1. A deflector structure for use with heaters and the like comprising a face plate adapted to be secured to the heater, said face plate having an opening formed therein, a pivot member extending across said opening, said pivot member being clamped between the heater and said face plate, and a deflector plate mounted on said pivot member and adapted to be swung about the axis of said pivot member.

2. A deflector structure for heaters and the like comprising a face plate secured to the heater, said face plate having an opening formed therein, a pivot member extending across said opening, said pivot member being held between the heater and said face plate, and a plurality of deflector plates mounted on said pivot member and adapted to be swung about the axis of said pivot member whereby the position of said deflector plates may be changed relative to the heater and relative to each other.

3. A deflector structure for use with heaters and the like comprising a face plate adapted to be secured to the heater, said face plate having an opening formed therein, grooved portions formed in said face plate at opposite sides of said opening, a pivot member extending across said opening, the ends of the pivot member being held in said grooved portions, and a plurality of deflector plates swingably mounted on said pivot member.

4. A deflector structure for use with heaters and the like comprising a face plate adapted to be secured to the heater, said face plate having an opening formed therein and having grooved portions formed therein at opposite sides of said opening, a pivot member extending across said opening, the ends of the pivot member being bent at an angle to the central portions thereof and said ends being held in said grooved portions whereby movement of said pivot member in any direction is prevented, and a plurality of deflector plates swingably mounted on said pivot member.

DANIEL S. MAXWELL.